(12) United States Patent  (10) Patent No.: US 10,719,387 B2
Jones  (45) Date of Patent: Jul. 21, 2020

(54) MEMORY INTERFACE WITH TAMPER-EVIDENT FEATURES TO ENHANCE SOFTWARE SECURITY

(71) Applicant: Oracle International Corporation, Redwood Shores, CA (US)

(72) Inventor: Ian W. Jones, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 44 days.

(21) Appl. No.: 15/962,783

(22) Filed: Apr. 25, 2018

(65) Prior Publication Data

US 2019/0332465 A1     Oct. 31, 2019

(51) Int. Cl.
| G06F 11/10 | (2006.01) |
| G06F 21/78 | (2013.01) |
| G06F 16/23 | (2019.01) |
| G06F 11/22 | (2006.01) |
| H03K 3/037 | (2006.01) |
| G11C 11/413 | (2006.01) |

(52) U.S. Cl.
CPC ...... *G06F 11/1004* (2013.01); *G06F 16/2365* (2019.01); *G06F 21/78* (2013.01); *G11C 11/413* (2013.01); *H03K 3/0372* (2013.01)

(58) Field of Classification Search
CPC .. G06F 11/1004; G06F 16/2365; G06F 21/78; G11C 11/413; H03K 3/0372
See application file for complete search history.

(56) References Cited

U.S. PATENT DOCUMENTS

| 3,571,505 A | * | 3/1971 | Mounts | H04B 1/66 375/240.12 |
| 4,737,909 A | * | 4/1988 | Harada | G06F 12/1027 711/3 |
| 5,721,739 A | * | 2/1998 | Lyle | G06F 11/1068 714/755 |
| 6,118,742 A | * | 9/2000 | Matsui | G11B 19/247 369/47.48 |

(Continued)

OTHER PUBLICATIONS

Jang, Error-Correcting Code Aware Memory Subsystem, IEEE, vol. 33, Issue: 11, Pertinent pp. 1706-1717 (Year: 2014).*

(Continued)

*Primary Examiner* — April Y Blair
*Assistant Examiner* — Dipakkumar B Gandhi
(74) *Attorney, Agent, or Firm* — Park, Vaughan, Fleming & Dowler LLP (57) ABSTRACT

The disclosed embodiments provide a system with a memory with an interface that includes tamper-evident features to enhance software security. The system includes a set of memory elements, wherein each memory element comprises storage for a set of bits that encode a data word and an associated validity indicator, which indicates whether the memory element contains a valid data word. It also includes a memory interface for the set of memory elements. This memory interface supports a conditional-write operation, which overwrites a data word in a memory element if an associated validity indicator indicates that the data word does not contain valid data, and which does not overwrite the data word and raises an error if the associated validity indicator indicates that the data word already contains valid data.

16 Claims, 9 Drawing Sheets

(56) References Cited

U.S. PATENT DOCUMENTS

| | | | | |
|---|---|---|---|---|
| 7,013,372 | B2* | 3/2006 | Achiwa | G06F 11/2041 711/162 |
| 8,780,648 | B2* | 7/2014 | Koeppe | G11C 19/28 365/189.02 |
| 2003/0214956 | A1* | 11/2003 | Navada | H04L 12/4645 370/401 |
| 2005/0036371 | A1* | 2/2005 | Kushida | G06F 11/1008 365/201 |
| 2006/0048148 | A1* | 3/2006 | Gootherts | G06F 9/4843 718/100 |
| 2006/0168494 | A1* | 7/2006 | Trainin | H03M 13/2915 714/758 |
| 2006/0282751 | A1* | 12/2006 | Passint | G06F 11/1004 714/785 |
| 2007/0234182 | A1* | 10/2007 | Wickeraad | G06F 11/1008 714/763 |
| 2007/0271471 | A1* | 11/2007 | Merzlikine | G06F 12/1408 713/193 |
| 2009/0006717 | A1* | 1/2009 | Rothman | G06F 11/261 711/102 |
| 2009/0327818 | A1* | 12/2009 | Kogelnik | G06F 11/1004 714/49 |
| 2010/0083065 | A1* | 4/2010 | Longwell | G06F 11/106 714/746 |
| 2010/0290278 | A1* | 11/2010 | Kim | G11C 13/0004 365/163 |
| 2011/0202748 | A1* | 8/2011 | Jacobi | G06F 9/3004 712/205 |
| 2012/0185636 | A1* | 7/2012 | Leon | H01L 23/576 711/102 |
| 2013/0111308 | A1* | 5/2013 | Sauber | G06F 11/1004 714/807 |
| 2014/0089602 | A1* | 3/2014 | Biswas | G06F 12/0804 711/144 |
| 2015/0089281 | A1* | 3/2015 | Tokoyoda | G06F 11/073 714/6.12 |
| 2015/0287445 | A1* | 10/2015 | Wang | G11C 7/1006 711/154 |
| 2016/0216894 | A1* | 7/2016 | Nango | G06F 3/0604 |
| 2016/0274816 | A1* | 9/2016 | Zhu | G06F 13/102 |

OTHER PUBLICATIONS

Jones; "Clocked asP* Control Circuit", Sun Microsystems Laboratories, SML #2000:0270, Jun. 12, 2000, 5 pages.

Molnar; Asynchronous Symmetric Persistent Pulse Protocol (asP*), Sun Microsystems Laboratories, SML #96:0161, Feb. 26, 1996, 16 pages.

Molnar et al.; "A Way to Compose Petri Nets", Sun Microsystems Laboratories, SML #92:0354, Oct. 29, 1992.

Peeters et al.; "Click Elements an Implementation Style for Data-Driven Compilation", 2010 IEEE Symposium on Asynchronous Circuits and Systems, 12 pages.

* cited by examiner

ORIGINAL CODE SEQUENCE

| | | |
|---|---|---|
| #101 | RESET | (reg A = X) |
| #102 | READ REG A | (returns: X; reg = X) |
| #103 | WRITE 42 REG A | (reg = 42) |
| #104 | READ REG A | (returns: 42; reg = 42) |
| #105 | READ REG A | (returns: 42; reg = 42) |
| | ... | |
| #199 | READ REG A | (returns: 42; reg = 42) |

MORE-SECURE MEMORY CODE SEQUENCE

| | |
|---|---|
| RESET | (reg A = RDV) |
| READ REG A | (invalid data RDV) |
| WRITE 42 REG A | (reg = 42) |
| READ REG A | (returns: 42; reg = 42) |
| READ_LAST REG A | (returns: 42; reg = NVDV) |
| ... | |
| READ REG A | (invalid data NVDV) |

FIG. 13

| ORIGINAL CODE SEQUENCE | | MORE-SECURE MEMORY CODE SEQUENCE | |
|---|---|---|---|
| #201 | RESET              (reg A = X) | RESET              (reg A = RDV) |
| #202 | WRITE 42 REG A     (reg = 42) | WRITE 42 REG A     (reg = 42) |
| #203 | WRITE -1 REG A     (reg = -1) (malicious) | WRITE -1 REG A     (reg = 42) (write waits) |
| | ... | ... |
| #249 | READ REG A         (returns: -1; reg = -1) | READ_LAST REG A    (returns: 42; reg = NVDV) |
| #250 | WRITE 53 REG A     (reg = 53) | WRITE 53 REG A     (reg = NVDV) (write waits) |
| #251 | READ REG A         (returns: 53; reg = 53) | READ REG A         (invalid data NVDV) |

FIG. 14

MEMORY INTERFACE WITH TAMPER-EVIDENT FEATURES TO ENHANCE SOFTWARE SECURITY

BACKGROUND

Field

The disclosed embodiments generally relate to mechanisms for protecting computer memory. More specifically, the disclosed embodiments relate to the design of a memory interface that has tamper-evident features to enhance software security.

Related Art

In a computer processor, memory that is used to store temporary data values can take a variety of forms, including: registers, addressable memory arrays, first-in-first-out (FIFO) memories, and stacks. Most memory elements used for such purposes are "static" and are fabricated using either master-slave flip-flops (FFs), or static random-access memory (SRAM) cells. Note that higher-level memory structures can be built using these memory elements, such as caches, data buffers, and register files. A reset/preset capability is often added to a memory so that memory can be initialized to a known value. This capability is frequently used for registers and FIFOs, but is less often employed in SRAM arrays because of the significant layout overhead. Control circuits are also used to manage the sequencing of reads and writes to the memory elements, such that a read returns the data value most recently written to the element. To keep memory accesses fast, most control circuits intentionally do not enforce the mutual exclusion of writes and reads, consequently leaving the responsibility of achieving the desired partial ordering of writes and reads to a higher-level protocol.

Moreover, when reading a memory element, there is usually no way to determine whether its data value is valid. Again, that responsibility is assigned to a higher-level protocol. Typically, a read will deliver whatever value is found in a memory element and no provision is made, for speed reasons, to handle the case when the read occurs concurrently with a write to the same memory location. Also, such memories provide no mechanism for distinguishing between a read after a reset and a read after a write. Furthermore, it is not usually possible to detect that a memory location has been written two or more times without each individual value being read.

However, the desire to keep memory accesses fast makes such memory elements vulnerable to malicious writes. For example, take a memory reset operation that initializes all memory values to 0. If if a malicious program subsequently writes to selected memory locations, a bona fide program cannot differentiate between the reset value of the data and the maliciously written values. Similarly, if a malicious program overwrites memory values, this cannot usually be detected.

Hence, what is needed is a mechanism for ensuring that the data values stored in such static memory elements are valid.

SUMMARY

The disclosed embodiments provide a system comprising a memory with an interface that includes tamper-evident features to enhance software security. (We refer to this type of memory as "tamper-evident memory" or "more-secure memory," which is comprised of "more-secure memory elements (MSMEs).") The system includes a set of memory elements, wherein each memory element comprises storage for a set of bits that encode a data word and an associated validity indicator, which indicates whether the memory element contains a valid data word. It also includes a memory interface for the set of memory elements. This memory interface supports a conditional-write operation, which overwrites a data word in a memory element if an associated validity indicator indicates that the data word does not contain valid data, and which does not overwrite the data word and raises an error if the associated validity indicator indicates that the data word already contains valid data. These conditional-read and conditional-write operations define a "more-secure memory protocol."

In some embodiments, the memory interface supports a read-again operation, which reads a data word from a memory element if an associated validity indicator indicates that the data word contains valid data, and which does not read the data word and raises an error if the associated validity indicator indicates that the data word does not contain valid data.

In some embodiments, the memory interface supports a read-last operation, which reads a data word from a memory element and clears an associated validity indicator if the associated validity indicator indicates that the data word contains valid data, and which does not read the data word and raises an error if the associated validity indicator indicates that the data word does not contain valid data.

In some embodiments, the conditional-write operation, the read-again operation and the read-last operation are activated by corresponding conditional-write, read-again and read-last executable-code instructions.

In some embodiments, the corresponding conditional-write, read-again and read-last executable-code instructions are kernel-mode instructions, which can only be executed by an operating system kernel.

In some embodiments, the validity indicator for each memory element is stored in an additional valid bit, which is separate from bits that encode the data word in the memory element.

In some embodiments, the validity indicator for each memory element comprises a special not-a-valid-data-value (NVDV) pattern, which is encoded in the set of bits that encode the data word and one or more additional bits in the memory element.

In some embodiments, the special NVDV pattern can include a reset-data-value (RDV) pattern indicating that the memory element was reset and not subsequently overwritten.

In some embodiments, each memory element includes an associated counter, which is set to zero upon reset of the memory element and is incremented on each successive write, wherein upon reading the memory element, a value in the associated counter value is checked against an expected value and a discrepancy can raise an error.

In some embodiments, the memory is located on a processor chip.

In some embodiments, the memory interface provides an asynchronous interface for read and write operations.

In some embodiments, the memory interface provides a synchronous interface for read and write operations.

In some embodiments, each memory element uses a set of latches to store data values, wherein the set of latches is made transparent if the memory element does not contain valid data.

In some embodiments, the memory interface supports a read-once operation, which reads a data word from a memory element and clears an associated validity indicator if the associated validity indicator indicates that the data word contains valid data, and which does not read the data word and raises an error if the associated validity indicator indicates that the data word does not contain valid data. In these embodiments, the memory interface also supports a data-duplication operation, which reads a source data word from a source memory element and writes the source data word to two different destination memory elements and also invalidates the source memory element. This data-duplication operation is executed on condition that at the start of the data-duplication operation: (1) the source data element contains valid data, and (2) both of the destination memory elements are empty. If any of these conditions is violated, the data-duplication operation does not take place, and an error is raised.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

More-Secure Memory Element

The disclosed embodiments provide a more-secure memory element, which includes a data validity indicator that provides greater security for data values. This validity indicator facilitates a variety of memory module implementations that are "more secure" than conventional memory modules. These more-secure memory modules make it possible to distinguish between data values that are "valid," as a consequence of writing data to the memory element, and data values that are "invalid" because they were "left behind" from a previous write or reset. We present an exemplary circuit that illustrates how to build such "more-secure memory modules."

However, this security comes at the cost of some extra control circuit gates, making memory access slightly slower. Additional circuits also sequence the order of writes and reads, removing enforcement of this task from a higher-level protocol. Note that the extra area overhead of these more-secure memory circuits can be made quite small when the validity information is amortized over entire data words. Furthermore, in the case of registers, we propose to use latches as the data storage primitive, which are half the size and incur less delay than MSFFs. Latches also have the useful property of being transparent when they are empty and so cannot store any value in this state.

In the case of SRAM cells, which are usually very compact and often built to a more relaxed set of design rules, the addition of the validity capability will noticeably increase circuit size and also decrease performance. However, in arrays of memory, the access time for writes and reads varies by location, and great care is taken in their design to try to reduce the spread in the memory access times. Usually, in a clocked memory this access time is rounded-up to satisfy the worst-case memory access time of the whole array. In reality, this limits the memory array size that can be accessed in a single clock cycle, or for large memory arrays, requires a lower clock frequency.

An asynchronous memory array interface implementation provides more flexibility, enabling fast access times for memory locations that are close-by, and slower access for locations that are further away, while still preserving full functionality. Note that the average access time is faster than for the worst-case condition. Furthermore, the control signals of an asynchronous memory interface can, if needed, be rounded-up to the next clock tick, enabling it to operate in a fully clocked environment.

Note that in an asynchronous implementation, the more-secure memory protocol is slightly more tolerant of timing, and all that is required is that the correct sequence of events is preserved. When a protocol violation occurs, the sequence of events will be incorrect, and typically an event signal that is expected will never occur, which will results in a deadlock. Raising an error is now a matter of reporting that the memory operation did not complete, and this can be achieved by running a watch-dog timer. In this way, if a memory write is issued but stalls and does not complete in a timely fashion, the system will raise an error.

Why Use More-Secure Memory?

A more-secure memory has several advantages over existing memory modules. A major advantage is the addition of data validity information, which is associated with the data. Another advantage is the ability to initialize/set the memory to known values that represent several "Not-a-Valid-Data Value" (NVDV) conditions, in a similar way to how Not-a-Number (NaN) is used for floating-point data. For example, before writing valid data values in to a memory array, we might first set every data word to some predetermined and easily recognized NVDV pattern. This writing of NVDV patterns to a memory array can be achieved in parallel, much like a reset operation, or alternatively, on a per-memory-element basis. Another NVDV pattern might be a "Reset-Data-Value," (RDV) pattern. Note that the addition of these "special" encoded data value patterns, requires one or more additional bits of memory for every data word, but the hardware cost to achieve this is quite low, while offering great flexibility and speed.

More-secure memory elements can provide multiple ways of writing-to the memory elements, such as "write via reset RDV," and "write valid data values." Similarly, more-secure memory elements can facilitate multiple ways of reading-from the memory elements, such as "read after which the data becomes invalid," and "read while keeping the data valid."

Figure 13:
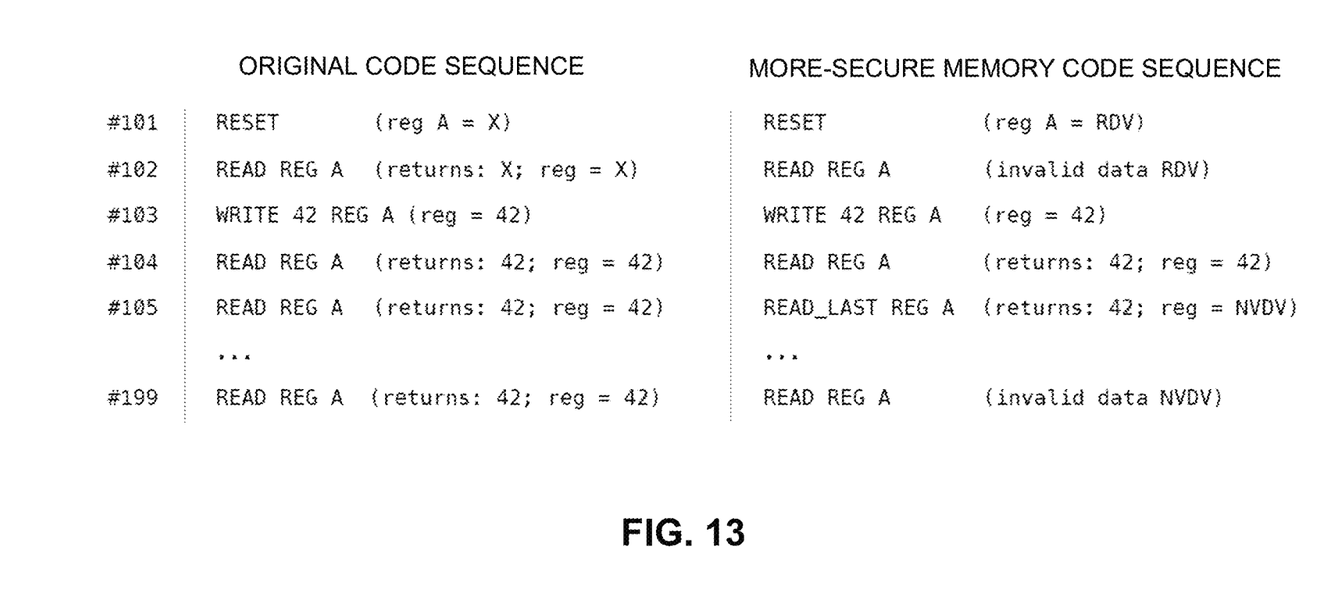
FIG. 13 presents an original code sequence that resets the state of a memory and a corresponding more-secure memory code sequence in accordance with the disclosed embodiments.
Figure 14:
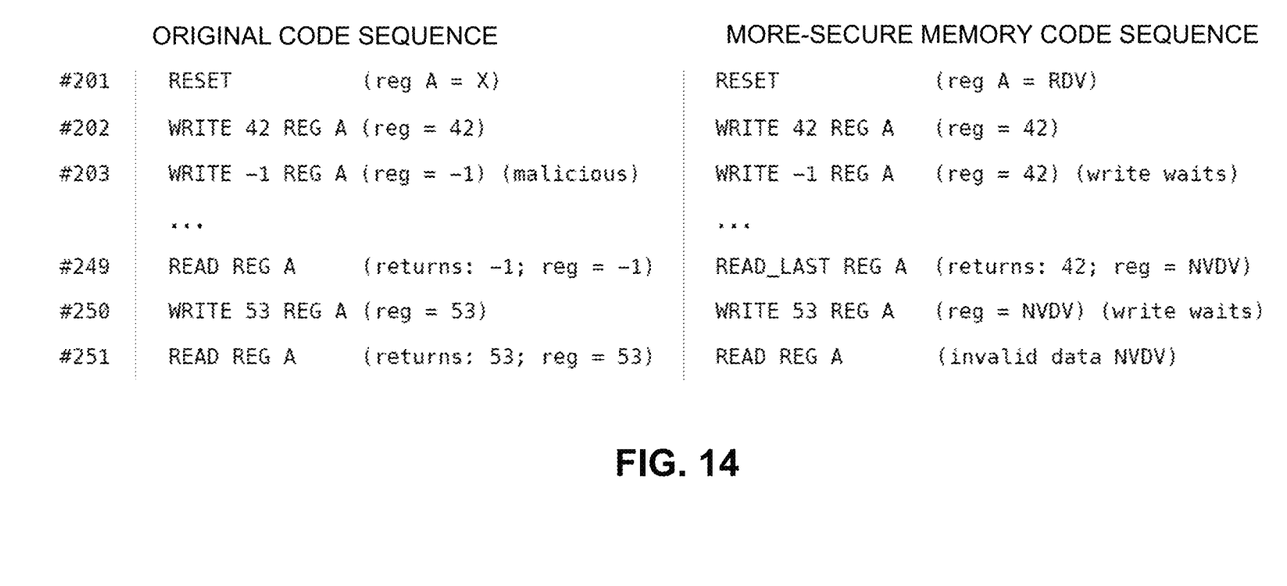
FIG. 14 presents an original code sequence for consecutive writes without an intervening read and a corresponding more-secure memory code sequence in accordance with the disclosed embodiments.

FIGS. 13 and 14 provide two exemplary code sequences to illustrate how the read and write instructions of a program might be modified to take advantage of using a more-secure memory register. In the sequence illustrated in FIG. 13, instruction #101 in the original code sequence resets the state of the memory, but the value stored in register A is the unknown value X, which will be treated as a valid data value when reading the register A value at instruction #102. In the corresponding more-secure memory code sequence, during the reset operation, register A's value is set to RDV. Note that reading a register immediately after the reset is detectable in the more-secure memory code sequence and could either return the invalid RDV data value, or the instruction could raise an error, or both. Instruction #103 writes a valid data value of 42 to register A. At instruction #105 the code sequences differ, and a new instruction type, READ_LAST, is used in the more-secure memory code sequence, to indicate that this is the last time that this particular value is to be read from register A, and the register data value is set to NVDV after this read completes. Later in the program, if an attempt is inadvertently made to read the register before a new value has been written into the register, as in instruction #199, this situation can again be detected from either the return value of NVDV or the instruction raising an error.

The second code sequence, which appears in FIG. 14, shows an example of how consecutive writes without an intervening read might be handled. As before, instruction #201 in the original code sequence resets the state of the memory, but the value stored in register A is an unknown value X. In the more-secure memory code sequence, the reset of the memory sets register A's value to RDV. Instruction #202 writes the value 42 to register A in both cases. The malicious instruction #203 attempts to write a −1 value into register A, and succeeds in the original code sequence, but the write has to wait in the more-secure memory code sequence because the register is not empty. At some later point in the code, instruction #249 reads register A, returning the malicious value in the original code sequence, while the READ_LAST instruction returns 42 and sets the value to NVDV in the more-secure memory code sequence. Instruction #250 attempts to write the value 53 into register A, but in the more-secure memory code sequence the write waits because there is still the write waiting from instruction #203. Instruction #251 returns 53 in the original code sequence, while in the more-secure memory code sequence, the read either returns the invalid data value of NVDV or the instruction raises an error. Thus, the malicious write results in an incorrect data value being returned at instruction #249 in the original code sequence, while in the more-secure memory code sequence the correct value was returned, and later at instruction #251 we can detect that there was a problem earlier in the code.

Thus, the memory can be made more secure through two data-validity mechanisms: (1) employing special invalid data values; and (2) the ability to detect in hardware that data is invalid. Both of these mechanisms can be made available to the programmer.

A way to further reduce the ability to maliciously alter data values in registers is to make all registers single-read by using a special "read-once instruction," and also providing a special "data-duplication instruction," which duplicates a data value by reading the value from one register and writing it to two different registers. (Note that in this case the read-again instruction can optionally be removed.)

The data-duplication instruction (e.g., "dup A B C") carries out the following three operations as a single instruction: (1) it reads the data value in register A, and clears the associated validity indicator of register A, marking register A data as invalid; (2) it writes the data read from register A into register B, and sets register B data as valid; and (3) it writes the data read from register A into register C, and sets register C data as valid. If any one of these three operations violates the more-secure memory protocol, then an error is raised. Hence, an error will be raised if at the start of the data-duplication instruction one of the following conditions is true: register A contains invalid data; register B is not empty; or register C is not empty.

The read-once instruction replaces both the read-again and the read-last operation and its operation is identical to read-last instruction. Note that if all memory elements have their read-again interface removed, then the only way to use a data value multiple times is to use the data-duplication instruction. However, the cost of this added security is a greater number of registers.

The above-described security measures might be circumvented by inserting malicious READ_LAST and WRITE pairs, but a checksum on the instruction stream, which would indicate whether the intended sequence of instructions had been altered, could help address this situation. Also, preventing multiple threads from being allowed to execute can reduce the chance that another program could alter memory values.

Another way to address the problem of an adversary maliciously adding READ_LAST and WRITE instruction pairs is to add a counter to each memory location. This counter can be implemented using additional bits in the memory word, or using a separate counter. The counter is set to 0 upon reset and is incremented on each successive write to the memory location. When reading the memory location, the counter value can be checked against its expected value, and any discrepancy can raise an error. Note that the counter value can be read just as if it is another register address. However, the counter value cannot be written except via reset, and the counter value is incremented on each write. For highest security, a data value is stored in the register just once, after reset. In this situation, the most important count values corresponding to this memory register would be 0 and 1:0 indicating that it is still in the reset state, and 1 indicating that it has been written to just once. Any higher count values will indicate that the memory value should be treated as invalid and that the code has then been tampered with. Of course, adding such counters to enhance security increases complexity and circuit area, and also slows memory accesses slightly. Thus, it is again a trade-off between higher security and hardware speed and area, but it will be orders of magnitude faster than any software implementation.

In some implementations, latches can be used to store the data rather than standard two-latch master-slave flip-flops (MSFFs). This not only has the advantage of halving the total number of latches, but when the latch is "empty," it can be made transparent so that it truly cannot store any data. In essence, when it is empty, it behaves like a combinational buffer. In addition, if the input data values supplied to empty latches are NVDV patterns, then this provides a further security feature for the memory.

These additional data security features incur some amount of additional cost, in terms of speed, area, and complexity, not just in hardware, but also in their use. Although the proposed designs greatly minimize the additional cost, they are worth taking advantage of only when the benefits outweigh the additional cost. An exemplary application that might be appropriate is where high security is needed, such as in some small "trusted" module within a computer system.

Exemplary More-Secure Memory Circuit

To illustrate a more-secure memory circuit element, we present an exemplary implementation that uses asynchronous control signals. We also show how the circuit can be operated in a fully clocked environment. To simplify this example, we omit mechanisms for detecting and raising errors and also omit the reset control signal, although a reset mechanism is required to set the initial state of the memory control circuit. The basic memory register simply waits when a write is attempted while it is not empty, and similarly waits whenever a read is requested while it is empty. Adding error-detecting circuits for these "error" cases can be easily done. But for now, we wish to focus on the benefit of having data validity signals.

Figure 1:
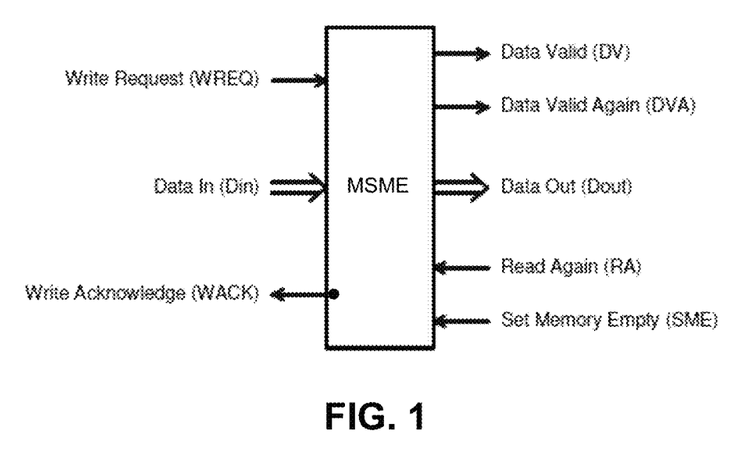
FIG. 1 illustrates a more-secure memory interface in accordance with the disclosed embodiments.

FIG. 1 shows the interface signals for a more-secure memory element (MSME), which stores a single data word and uses asynchronous bundled data input and output control signals. The left-hand interface is the input (or write interface), which comprises an input data bus with a pair of bundled request/acknowledge control signals. The right-hand interface has an output data bus with two pairs of request/acknowledge control signals. We refer to the initial control signal assertions as "events," and then use the asynchronous Persistent Pulse Protocol (asP*) encoding scheme of these events to produce circuit implementation. (See Charles E. Molnar "Asynchronous Symmetric Persistent Pulse Protocol—asP*," Sun Microsystems Laboratory Technical Report No. 96:0161, 4 Apr. 1996.) We use the asP* protocol because it can easily be implemented using standard logic cells, such as NAND gates, and thus can be readily implemented in a field-programmable gate array (FPGA). Furthermore, there is a straightforward mapping of asP* control logic circuits into a fully clocked implementation, where each asynchronous event is rounded-up to the next clock tick. (See Ian W. Jones, "Clocked asP* Control Circuit," Sun Microsystems Laboratory Technical Report No. 2000:0270, 12 Jun. 2000.) Another suitable implementation style is associated with "click elements." (See Ad Peeters, Frank to Beest, Mark de Wit, and Willem Mallon, "Click Elements: An Implementation Style for Data-Driven Compilation," IEEE Symposium on Asynchronous Circuits and Systems (ASYNC), 2010.)

A way to think about the asP* protocol is that request/acknowledge signals are always paired, and that each event is conveyed by a rising transition of the control signal wire. Module input events set or reset the state of an SR latch, which makes the event persistent. A short time thereafter, a falling transition is generated on the event signal wire, completing the pulse. Note that these falling edges carry no event information, but merely serve to enable new input events. The width of the pulses and their intervals are automatically adjusted by the asynchronous control circuits to accommodate the activity of the module.

For the MSME module, the input control-to-data bundling constraint requirement is that Data In (Din) must be valid and stable prior to the input Write Request (WREQ) event. Moreover, after the WREQ event, Din must be kept stable until after a Write Acknowledge (WACK) event has been received in return. The output bundling constraint is that a Data Valid (DV) event is generated after Data Out (Dout) are valid. Note that Dout will be kept valid until after a Set Memory Empty (SME) event has been received. If Dout needs to be read more than once, the reader uses the additional Read Again (RA) and Data Valid Again (DVA) request/acknowledge pair. Note that sending an RA event generates a DVA event, which permits the reader to capture another copy of Dout.

Figure 2:
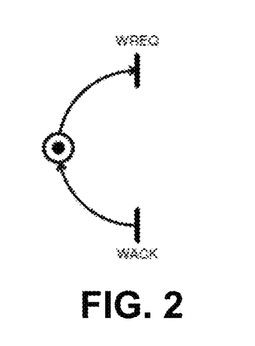
FIG. 2 illustrates a Petri net snippet for the input interface in accordance with the disclosed embodiments.
Figure 3:
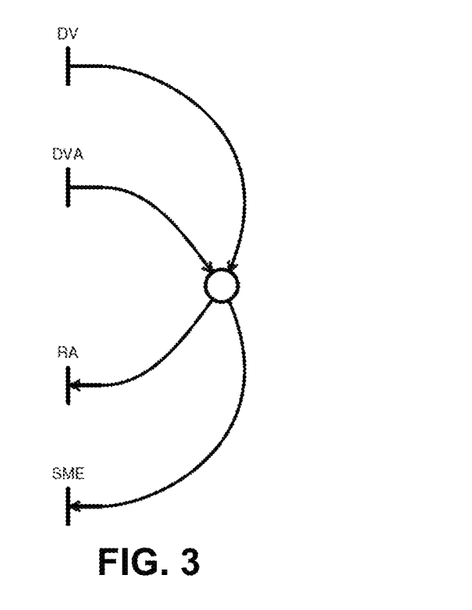
FIG. 3 illustrates a Petri net snippet for the output interface in accordance with the disclosed embodiments.
Figure 4:
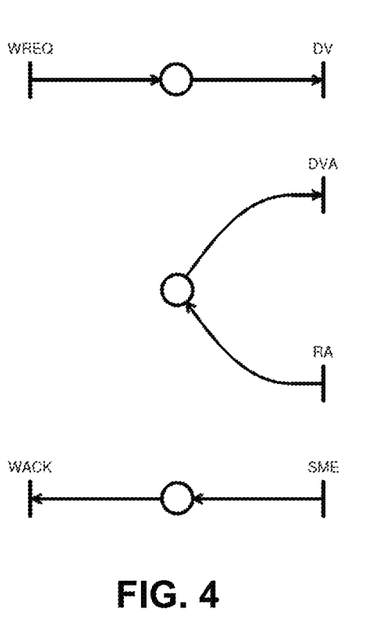
FIG. 4 illustrates a Petri net snippet for specification for the memory element in accordance with the disclosed embodiments.

The specification of the more-secure memory element and its interface control signal operation is described by the three Petri net snippets illustrated in FIGS. 2-4. Note that we use the open-form version of Petri net snippets as they offer an easier-to-understand specification of the event sequences, and then combine these snippets to generate the complete specification. See the Appendix for a brief description of Petri nets. (Also, see Charles E. Molnar, Ian W. Jones, and Ivan E. Sutherland, "A Way to Compose Petri Nets," Sun Microsystems Laboratory Technical Report No. 92:0354, 29 Oct. 1992.)

For the specification of the MSME, the first Petri net snippet, illustrated in FIG. 2, describes the required behavior of the input environment. The sequence of request/acknowledge control events for this interface is very simple: WREQ follows WACK, and initially WREQ is enabled to fire. In the context of the input data bundling, where WREQ is bundled to Din: first, new values of Din are asserted. This is followed by its valid control signal WREQ. Each WREQ must wait for a corresponding acknowledge signal, WACK, before the Din values are permitted to change and enable a subsequent WREQ event. The dot by the WACK signal wire in FIG. 1, and the token in place in FIG. 2, indicate the initial condition of the input interface: this interface is initialized as if a WACK event has already been sent, thus permitting fresh data to be delivered.

The next snippet, illustrated in FIG. 3, specifies the behavior of the output environment. The sequence of request/acknowledge control events for this interface is also straightforward. Data output validity events, DV or DVA, put a token into a single shared place. When the data have been used, fresh data are requested by setting the memory to empty, with an SME event. Alternatively, a request to read the data value again can be made with an RA event. The output response indicating that the data can be read again is event DVA. Finally, when the current data are no longer needed, an SME event is issued. Referring back to FIG. 1, the validity of Dout is thus bundled with either output request event DV or event DVA: first Dout must be stable before either output DV or DVA requests can be generated, indicating Dout's validity. Dout is declared invalid once either acknowledgment RA or SME have been received. Note that although Dout is declared invalid after receipt of an RA or an SME, in the case of an RA, its value does not actually change. In a more feature-rich version of the design that uses NVDV's, the data value changes from its valid value to NVDV whenever an SME input event is received.

A feature that makes this memory element more secure is this choice made by the output environment to send either SME or RA events. This is because once the element has been set to empty, no new data can be read from the element until a new data value has been written into it. This makes it harder to inadvertently or maliciously leave some alternative data in the memory element. What remains to complete the memory-element specification is the snippet that describes the functionality of the memory element itself: this is specified in its simplest form by the snippet shown in FIG. 4. This snippet specifies that an output DV event cannot be generated until after fresh input data have been received, as reported by input WREQ event. Similarly, an SME event enables a WACK event output to be generated at the input interface, thereby permitting fresh data to be delivered to the memory element. Reuse of the output data is facilitated by the request/acknowledge event sequence RA followed by DVA. Note that the input interface of the memory element does not need to be informed that the output data are being reused.

Figure 5:
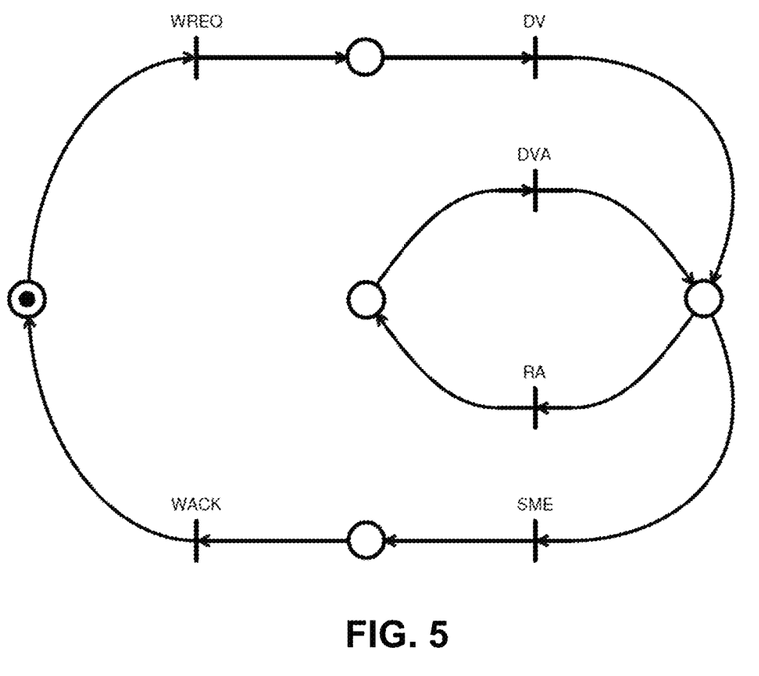
FIG. 5 illustrates a complete Petri net specification for the memory element in accordance with the disclosed embodiments.

Weaving these three Petri net snippets together combines the partial truths of the input and output interfaces with that of the memory element itself to produce the complete closed-form Petri net specification of the control signals, as shown in FIG. 5.

Note that the initial state of this control specification is indicated by the single token in the far-left place, enabling the first WREQ input request. For simplicity, the specification is silent about how this initial state is reached, but in a circuit implementation, some means of reset must be provided to force this initial state.

Figure 6:
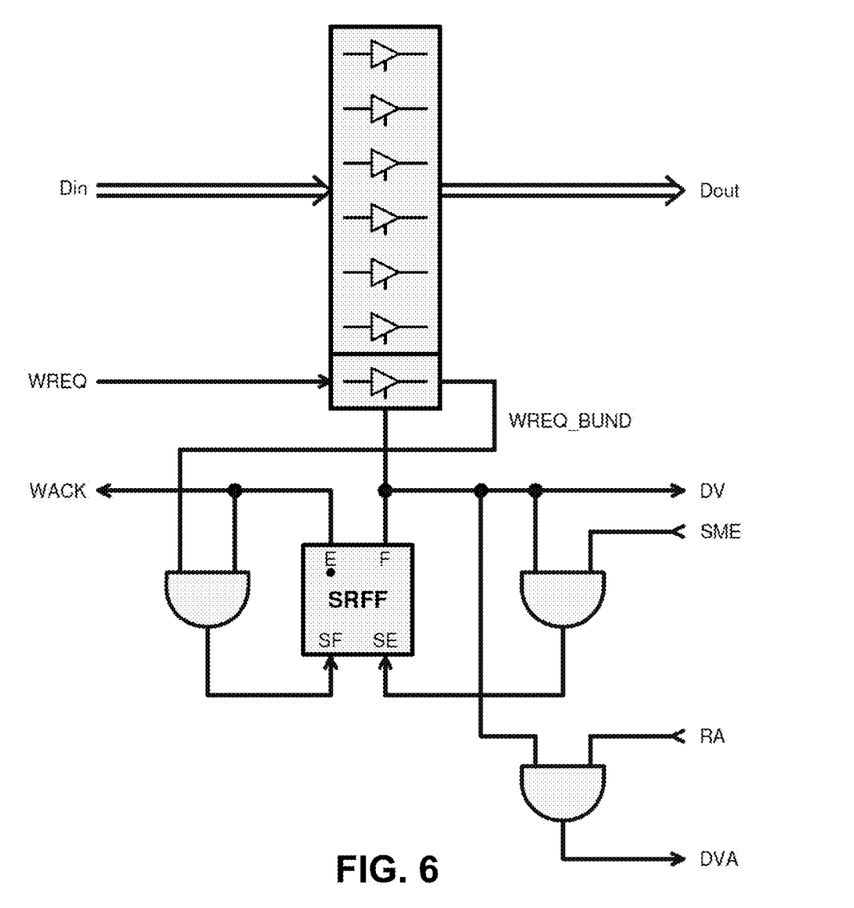
FIG. 6 illustrates an exemplary circuit implementation for the memory element in accordance with the disclosed embodiments.

The circuit in FIG. 6 illustrates an implementation of the more-secure memory specification of FIG. 5. This circuit uses transparent latches for the data storage register, and has a control circuit that enables data to be read only when the latches are "full" and storing data. Note that the circuit as shown omits mechanisms for resetting/presetting invalid data values described above, although a reset signal will be needed to initialize the control to the "empty" state, and make the data latches transparent. Thus, the latches between Din and Dout store data when the full signal "F" is asserted, and when F is de-asserted, in which case all the latches are empty and transparent. The circuit is based on the asP* design style which has the major advantage that it uses very standard circuit gates, making it easy to implement in many different technologies, including FPGAs. Events in the Petri net specification of FIG. 5 are mapped to rising transitions of the signals in the circuit in FIG. 6.

In this circuit, we take advantage of the transparency of the latches to help manage the bundling constraint of the WREQ signal, which is bundled with the new data values supplied at Din. Note that the WREQ signal must propagate through an extra latch in the register, wire WREQ_BUND, before being delivered to the control circuit at the bottom of FIG. 6. With appropriate delay matching of this extra latch to the data latches, the data will have propagated through the transparent latches before the control changes their state to opaque. In this implementation, all the latches are transparent (empty), when their latch control input is at logic 0, and opaque (full) when at logic 1. A SRFF handles the empty and full control states of the register, where the set and reset outputs are named F and E respectively. This SRFF is initialized to be empty, which we indicate by the • adjacent to the E output. When asserted, the F output is used to switch the latches from transparent to opaque (empty to full). When the SRFF is empty, which means that E is asserted and F is de-asserted, the left-hand AND gate is enabled and the WREQ_BUND propagates to the Set-Full (SF) input of the SRFF, thus changing the SRFF's state from empty to full. Its full output F is asserted, which switches the latches to opaque to store the data. Note that the full signal F is persistent and maintains the opacity of the latches. It is also used to generate the DV output indicating that the output data are now valid.

When the F output is asserted, the E output of the SRFF is de-asserted, disabling the left-hand AND gate and removing the Set-Full (SF) signal. It also delivers the falling edge of the WACK pulse. The control circuit now remains stable in this state waiting for either an RA, an input event or an SME input event. This control state corresponds to the right-most place in the Petri net specification shown in FIG. 5. In this state, the output environment has two choices: to deliver either an RA signal, or an SM signal. Because in this state the SRFF is still in the full state, F is asserted, and an RA input generates a DVA output signal, declaring that the output data is valid again, and permitting the output environment to use the output data. But if the output environment sends an SME signal, it will be propagated to the SE input of the SRFF, switching the SRFF state back from full to empty, generating a WACK signal to the input environment, and returning to the initial state.

Figure 7:
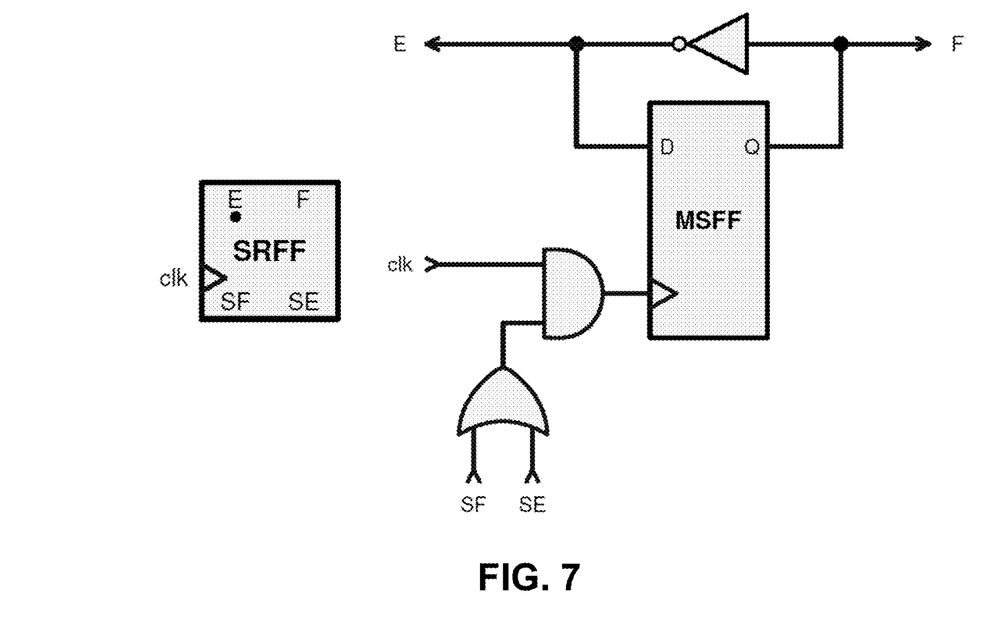
FIG. 7 illustrates an implementation for a set-reset flip-flop (SRFF) based on a master-slave flip-flop (MSFF) in accordance with the disclosed embodiments.

This MSME implementation of FIG. 6 can also be used in a clocked environment by replacing the SRFF with a clocked version of the SRFF using clock gating of a master-slave flip-flop (MSFF) as illustrated in FIG. 7. This modification, which enables an asP* control circuit to be used in a clocked environment is the technique, which is described in ([Jones 2000] Ian W. Jones, "Clocked asP* Control Circuit," Sun Microsystems Laboratory Technical Report No. 2000:0270, 12 Jun. 2000), and rounds the asynchronous event up to the next clock tick. The MSFF used for this clocked set-reset flip-flop must be initialized to set its Q output to 0. The initial state and the specified alternation of the register between empty and full simplifies this clocked implementation, allowing an OR gate to combine the SF and SE signals. This circuit is again easily implemented in a wide range of technologies, including FPGAs. As described in [Jones 2000], there are local timing constraints on the clock enable signals: the clock enable signals must be stable before the clock signal changes from low to high, and the clock enable signals must not change until after the clock has gone low again. This is a standard setup and hold constraint required to avoid meta-stability in the flip-flops.

Computer System

Figure 8:
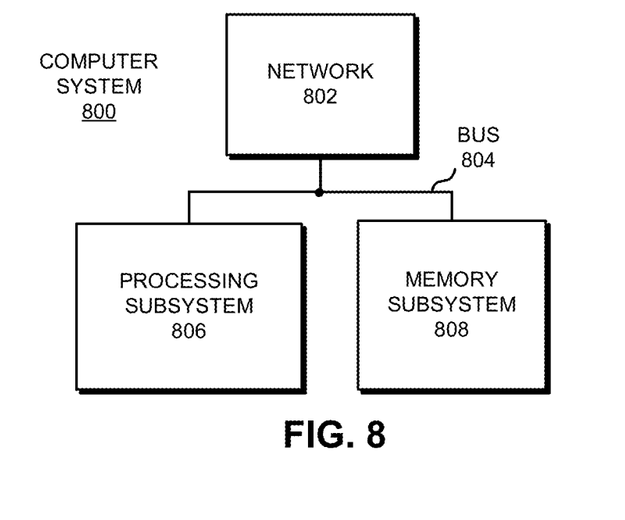
FIG. 8 illustrates a computer system including a memory with an interface that has tamper-evident features in accordance with the disclosed embodiments.

In the preceding embodiments, the memory interface illustrated in FIGS. 1-7 may be integrated into a computing system or device. More specifically, FIG. 8 illustrates a computer system 800 that includes a network 802 and a processing subsystem 806 comprising one or more processors and a memory subsystem 808 comprising a random-access memory. Within computer system 800, the above-described memory interface and an associated memory comprising a number of registers can be integrated into a processing chip in processing subsystem 806.

In general, components within computer system 800 may be implemented using a combination of hardware and/or software. Thus, computer system 800 may include one or more program modules or sets of instructions stored in a memory subsystem 808 (such as DRAM or another type of volatile or non-volatile computer-readable memory), which, during operation, may be executed by processing subsystem 806. Furthermore, instructions in the various modules in memory subsystem 808 may be implemented in: a high-level procedural language, an object-oriented programming language, and/or in an assembly or machine language. Note that the programming language may be compiled or interpreted, e.g., configurable or configured, to be executed by the processing subsystem.

Components in computer system 800 may be coupled by signal lines, links or buses, such as bus 804. These connections may include electrical, optical, or electro-optical communication of signals and/or data. Furthermore, in the preceding embodiments, some components are shown directly connected to one another, while others are shown connected via intermediate components. In each instance, the method of interconnection, or "coupling," establishes some desired communication between two or more circuit nodes, or terminals. Such coupling may often be accomplished using a number of photonic or circuit configurations, as will be understood by those of skill in the art; for example, photonic coupling, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, computer system 800 may be at one location or may be distributed over multiple, geographically dispersed locations.

Computer system 800 may include: a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device.

Moreover, network 802 can be used in a wide variety of applications, such as: communications (for example, in a transceiver, an optical interconnect or an optical link, such as for intra-chip or inter-chip communication), a radio-frequency filter, a biosensor, data storage (such as an optical-storage device or system), medicine (such as a diagnostic technique or surgery), a barcode scanner, metrology (such as precision measurements of distance), manufacturing (cutting or welding), a lithographic process, data storage (such as an optical-storage device or system) and/or entertainment (a laser light show).

CONCLUSION

We have presented several ways to improve the security of data stored in local memory in a processor. An exemplary circuit that implements the basic data validity security feature is used to demonstrate the feasibility of a more-secure memory register design. More complex memory circuit cells are proposed that can detect and report illegal read and write situations. The circuits are simple to implement in a wide range of technologies, including FPGAs. The more-secure features of the memory can be made accessible to the programmer by the addition of a few instructions that are variations of the existing read/write instructions. These additional data security features obviously come at some cost, such as speed, area, and complexity, not just in hardware, but also in their use. Although the designs we propose greatly minimize additional costs, they are worth taking advantage of only when the benefits outweigh the additional costs. An exemplary application that might be appropriate for more-secure memory implementations is where high security is needed, such as in a small "trusted" module within a computing system.

APPENDIX

Petri nets provide a concise way to specify concurrent asynchronous finite state systems. Petri nets comprise events (represented as bars), and places (represented as circles), with arcs connecting these events and places. Tokens (shown as filled black circles) are positioned in some of the places and mark the initial conditions. Multiple tokens are permitted to be in a single place. An event can fire if all the places with arcs leading to the event have at least one token. When the event fires, it consumes one token from each place with arcs leading to the event, and generates a token to put into every place with an arc leading from the event. An asynchronous interface state graph can be produced by exercising a Petri net with all permutations of event orderings. Note that this can often lead to a very large and complex state graph.

Figure 9:
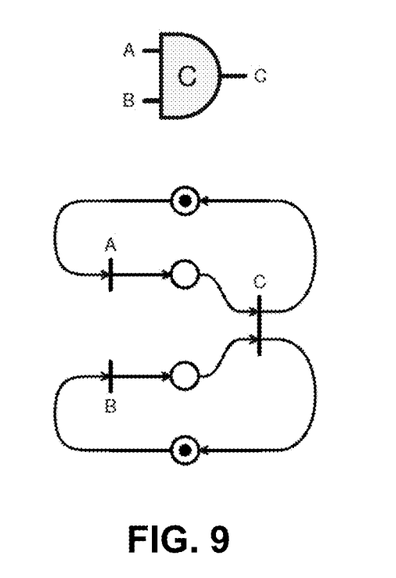
FIG. 9 illustrates a C-element Petri net specification in accordance with the disclosed embodiments.

FIG. 9 illustrates a simple Petri net that specifies the behavior of a two-input C-element, a basic asynchronous control-circuit element. A C-element is an "AND gate" for events. This means when an event has been received on each of its inputs, it can generate its output. Because of its functionality, a C-element is sometimes called a "rendezvous" element or a "last-of" element, because it can generate an output event only after the last input event of all of its inputs has been received. The symbol for a two-input C-element is shown at the top of FIG. 9, with inputs A and B, and output C. A Petri net that specifies the behavior of the two-input C-element has the three event bars A, B, and C, and four places. The Petri net is initialized, thereby allowing both input events A and B to fire. The firing of event A generates a token in the upper place with an input arc to event C, while the firing of event B generates a token in the lower place with an input arc to event C. Only after both places with arcs leading to event C contain a token can event C fire, after which it generates two tokens, one in the upper place and one in the lower place, thus returning to the initial state.

Figure 10:
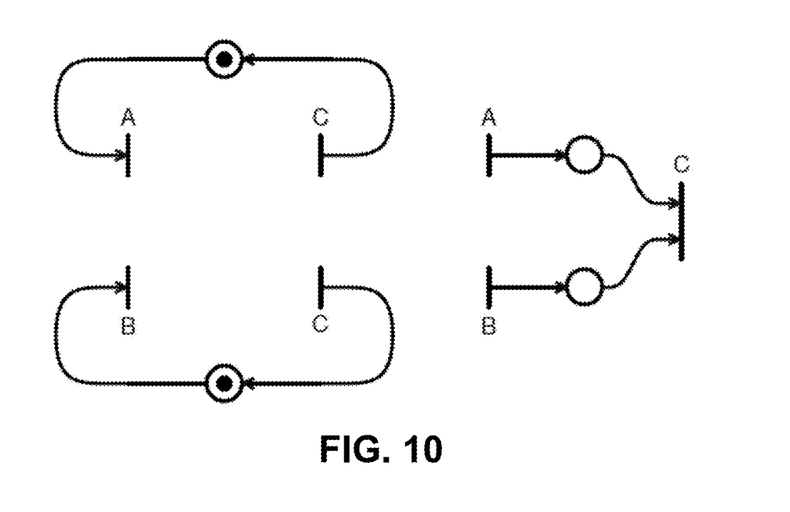
FIG. 10 illustrates a C-element specification using Petri net snippets in accordance with the disclosed embodiments.

Open-form Petri net snippets, sometimes called "unbounded Petri nets," are a way of stating partial truths about event firings, such as "event A follows event B" and "event E must be preceded by events C and D." For example, the above C-element specification can be expressed by the three open-form snippets, as shown in FIG. 10. The two snippets on the left specify the A and B input environments and state the partial facts that each A input event follows a C output event, and that each B input event follows a C output event. Both these snippets are initialized as if a C output event has already occurred. The third snippet specifies the behavior of the C-element: it is permitted to generate a C output event only after both an A and a B input event have been received. Open-form Petri net snippets must first be combined, or "woven," with one or more other snippets by joining all events with the same event name into a single event, while maintaining all of the original places, to produce a regular closed-form Petri net. Weaving the three snippets of FIG. 10 produces the Petri net of FIG. 9.

Figure 11:
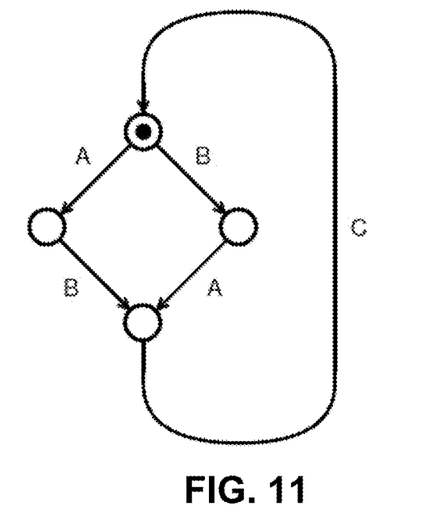
FIG. 11 illustrates a C-element specification interface state graph (ISG) in accordance with the disclosed embodiments.
Figure 12:
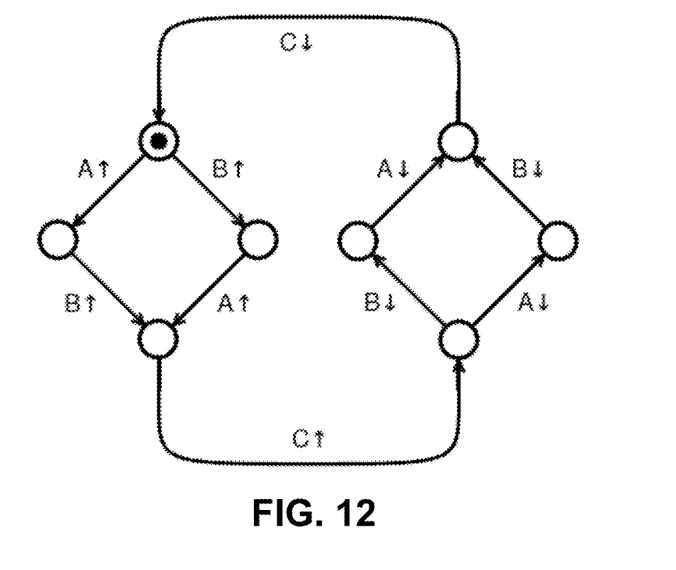
FIG. 12 illustrates a C-element specification encoded interface state graph (EISG) in accordance with the disclosed embodiments.

The combining of Petri nets, by weaving, is generally more efficient than carrying out the weaving of events at the interface state graph level. This is because it reduces the number of permutations of orderings of events before exercising the Petri net and expanding it into states, which reduces the chances of the state explosion problem, which is a major problem that is often encountered when combining component specifications at the state graph level. Exercising the C-element specification generates the Interface State Graph (ISG) shown in FIG. 11. The events in this state graph can further be expanded into rising and falling signals, doubling the number of states in such an Encoded Interface State Graph (EISG) as with the exemplary state assignment shown in FIG. 12. Choices need to be made in the state encoding of the EISG to produce efficient circuit implementations. Note that synthesis techniques and tools can be used to generate circuit implementations from these specifications. (See J. Cortadella, M. Kishinevsky, A. Kondratyev, L. Lavagno, and A. Yakovlev, "Petrify: A Tool for Manipulating Concurrent Specifications and Synthesis of Asynchronous Controllers," Departament d'Arquitectura de Computadors, Universitat Politècnica de Catalunya, Tech. Rep., 1996.)

Note that a Petri net must be "live" before it can be exercised. This means it must have at least one event that can fire from its initial state. Moreover, checks can be carried out on Petri nets to prove their liveness such that they cannot deadlock. This occurs when the environment is waiting for the component to generate an output, but the component is unable to generate the output until after receiving an input from the environment. Additionally, checks can be made about the avoidance of live-lock, wherein a component continues to proceed through multiple state changes indefinitely without ever being required to generate an output.

A situation that represents choice in Petri nets is where a place has multiple output arcs leading to events. With a single token in this place, there is a choice of which event will fire. If this place lies in the environment of a component, then such choice, from the perspective of the component, is a deterministic choice: the environment decides which event to deliver to the component. If this place lies within a component, then the choice is non-deterministic, such as when the component has to arbitrate the order of receiving two or more input events. For example, such arbitration situations arise when a memory is shared between two asynchronous, or independently clocked modules.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A memory with an interface that includes tamper-evident features to enhance software security, comprising:
   a set of memory elements, wherein each memory element comprises storage for a set of bits that encode a data word and an associated validity indicator, which indicates whether the memory element contains a valid data word; and
   a memory interface for the set of memory elements;
   wherein the memory interface supports a conditional-write operation, which overwrites a data word in a memory element if an associated validity indicator indicates that the data word does not contain valid data, and which does not overwrite the data word and raises an error if the associated validity indicator indicates that the data word already contains valid data;
   wherein the memory interface supports a read-again operation, which reads a data word from a memory element and does not clear an associated validity indicator if the associated validity indicator indicates that the data word contains valid data, and which does not read the data word and raises an error if the associated validity indicator indicates that the data word does not contain valid data; and
   wherein the memory interface supports a read-last operation, which reads a data word from a memory element and clears the associated validity indicator if the associated validity indicator indicates that the data word contains valid data, and which does not read the data word and raises an error if the associated validity indicator indicates that the data word does not contain valid data.

2. The memory of claim 1, wherein the conditional-write operation, the read-again operation and the read-last operation are activated by corresponding conditional-write, read-again and read-last executable-code instructions.

3. The memory of claim 2, wherein the corresponding conditional-write, read-again and read-last executable-code instructions are kernel-mode instructions, which can only be executed by an operating system kernel.

4. The memory of claim 1, wherein the validity indicator for each memory element is stored in an additional valid bit, which is separate from bits that encode the data word in the memory element.

5. The memory of claim 1, wherein the validity indicator for each memory element comprises a special not-a-valid-data-value (NVDV) pattern, which is encoded in the set of bits that encode the data word and one or more additional bits in the memory element.

6. The memory of claim 5, wherein the special NVDV pattern can include a reset-data-value (RDV) pattern indicating that the memory element was reset and not subsequently overwritten.

7. The memory of claim 1, wherein each memory element includes an associated counter, which is set to zero upon reset of the memory element and is incremented on each successive write, wherein upon reading the memory element, a value in the associated counter value is checked against an expected value and a discrepancy raises an error.

8. The memory of claim 1, wherein the memory interface provides an asynchronous interface for read and write operations.

9. The memory of claim 1, wherein the memory interface provides a synchronous interface for read and write operations.

10. The memory of claim 1,
wherein each memory element in the set of memory elements uses a set of latches to store data values; and
wherein the set of latches is made transparent if the memory element does not contain valid data.

11. A computer system having memory with an interface that includes tamper-evident features to enhance software security, comprising:
one or more processors;
a memory coupled to the one or more processors;
wherein at least one processor in the one or more processors includes,
a set of memory elements, wherein each memory element in the set comprises storage for a set of bits that encode a data word and an associated validity indicator, which indicates whether the memory element contains a valid data word, and
a memory interface for the set of memory elements, wherein the memory interface supports a conditional-write operation, which overwrites a data word in a memory element if an associated validity indicator indicates that the data word does not contain valid data, and which does not overwrite the data word and raises an error if the associated validity indicator indicates that the data word already contains valid data;
wherein the memory interface supports a read-again operation, which reads a data word from a memory element and does not clear an associated validity indicator if the associated validity indicator indicates that the data word contains valid data, and which does not read the data word and raises an error if the associated validity indicator indicates that the data word does not contain valid data; and
wherein the memory interface supports a read-last operation, which reads a data word from a memory element and clears the associated validity indicator if the associated validity indicator indicates that the data word contains valid data, and which does not read the data word and raises an error if the associated validity indicator indicates that the data word does not contain valid data.

12. The computer system of claim 11, wherein the conditional-write operation, the read-again operation and the read-last operation are activated by corresponding conditional-write, read-again and read-last executable-code instructions.

13. The computer system of claim 12, wherein the corresponding conditional-write, read-again and read-last executable-code instructions are kernel-mode instructions, which can only be executed by an operating system kernel.

14. A memory with an interface that includes tamper-evident features to enhance software security, comprising:
a set of memory elements, wherein each memory element comprises storage for a set of bits that encode a data word and an associated validity indicator, which indicates whether the memory element contains a valid data word; and
a memory interface for the set of memory elements;
wherein the memory interface supports a conditional-write operation, which overwrites a data word in a memory element if an associated validity indicator indicates that the data word does not contain valid data, and which does not overwrite the data word and raises an error if the associated validity indicator indicates that the data word already contains valid data;
wherein the memory interface supports a read-once operation, which reads a data word from a memory element and clears an associated validity indicator if the associated validity indicator indicates that the data word contains valid data, and which does not read the data word and raises an error if the associated validity indicator indicates that the data word does not contain valid data;
wherein the memory interface supports a read-again operation, which reads a data word from a memory element and does not clear an associated validity indicator if the associated validity indicator indicates that the data word contains valid data, and which does not read the data word and raises an error if the associated validity indicator indicates that the data word does not contain valid data; and
wherein the memory interface supports a data-duplication operation, which reads a source data word from a source memory element and writes the source data word to two different destination memory elements and also invalidates the source data word, wherein the data-duplication operation is executed on condition that at the start of the data-duplication operation the source memory element contains valid data, and both of the destination memory elements are empty, and if any of the above conditions is violated, the data-duplication operation does not take place, and an error is raised.

15. The memory of claim 14, wherein the conditional-write operation, the read-once operation and the data-duplication operation are activated by corresponding conditional-write, read-once and data-duplication executable-code instructions.

16. The memory of claim 15, wherein the corresponding conditional-write, read-once and data-duplication executable-code instructions are kernel-mode instructions, which can only be executed by an operating system kernel.

* * * * *